United States Patent [19]

Brekner et al.

[11] Patent Number: 5,719,095
[45] Date of Patent: Feb. 17, 1998

[54] SUPPORTED CATALYST SYSTEM, THE PREPARATION THEREOF, AND THE USE THEREOF FOR THE POLYMERIZATION OF OLEFINS

[75] Inventors: Michael-Joachim Brekner, Frankfurt am Main; Bernd Bachmann, Eppstein/Taunus; Frank Osan, Kelkheim/Taunus; Klaus Alberti, Idstein/Taunus; Andreas Winter, Glashütten/Taunus, all of Germany

[73] Assignee: Hoechst AG, Germany

[21] Appl. No.: 196,285

[22] Filed: Feb. 10, 1994

[30] Foreign Application Priority Data

Feb. 12, 1993 [DE] Germany ............ 43 04 286.4

[51] Int. Cl.$^6$ .................................... C08F 4/64
[52] U.S. Cl. ................ 502/104; 502/117; 502/152; 502/522; 526/160; 526/943
[58] Field of Search ................ 502/522, 104, 502/152, 117

[56] References Cited

U.S. PATENT DOCUMENTS

| | | | |
|---|---|---|---|
| 4,564,647 | 1/1986 | Hayashi et al. | 523/211 |
| 5,122,491 | 6/1992 | Kioka et al. | 502/117 |
| 5,126,301 | 6/1992 | Tsutsui et al. | 502/108 |
| 5,308,816 | 5/1994 | Tsutsui et al. | 502/108 |
| 5,545,829 | 8/1996 | Brekner et al. | 526/160 |

FOREIGN PATENT DOCUMENTS

| | | |
|---|---|---|
| 0447070 | 2/1991 | European Pat. Off. . |
| 0523416 | 1/1993 | European Pat. Off. . |
| 1530445 | 11/1978 | United Kingdom . |

OTHER PUBLICATIONS

Journal of Polymer Science, Polymer Chemistry Edition, J.C.W. Chien et al, pp. 1609–1513 Ect. 1991.

European Search Report No. 94101797.2, Sep. 26, 1994.

Primary Examiner—David W. Wu
Attorney, Agent, or Firm—Connolly & Hutz

[57] ABSTRACT

The invention relates to a process for the preparation of a catalyst system supported on a support. The catalyst system is built up from at least one catalyst and at least one cocatalyst. The catalyst and the cocatalyst supported on a support material are brought into contact in a suspension solution. The fixing of the catalyst to the support is carried out under the action of microwaves.

25 Claims, No Drawings

SUPPORTED CATALYST SYSTEM, THE PREPARATION THEREOF, AND THE USE THEREOF FOR THE POLYMERIZATION OF OLEFINS

The present invention relates to a supported (heterogeneous) catalyst system, to the preparation thereof using microwaves, and to the use thereof for the polymerization of olefins.

An efficient and simple process for fixing, in particular, metallocenes to a support material has been described, for example, in European Patent Application EP-92107331.8, according to which fixing of a metallocene catalyst to a cocatalyst-coated support material is achieved by bringing the supported cocatalyst and the metallocene into contact with one another by stirring in a solvent. Catalyst systems supported in this way can be employed in polymerization processes for the preparation of, for example, polyethylene, polypropylene and cycloolefin copolymers.

Under industrially relevant polymerization conditions, however, the service life of supported metallocene catalyst systems prepared in this way, i.e. the time for which the catalyst systems can be employed without a significant drop in their activity, is unsatisfactory. In addition, better fixing of the metallocene is desirable, since poor fixing of the supported catalyst system can, under the polymerization conditions of an olefin polymerization, result in coatings on the reactor walls due to catalyst particles detached from the support material. Coatings of this type in the reactor systems must be removed regularly, since they hinder cooling exchange with the cooling medium.

In addition, unfavorable particle morphologies, i.e. relatively small particle diameters of the polymer particles, can occur under the industrially relevant polymerization conditions in the polymers formed. However, relatively large particle diameters (>100 μm) with the most uniform size distribution possible are desirable for simple polymer discharge from the reactor and for subsequent easy handling of the polymer.

In the preparation of highly pure and/or highly transparent polyolefins, such as, for example, cycloolefin copolymers, which substantially remain in solution during the polymerization, the quality of the separation of the supported metallocene catalyst system from the polymer solution by a filtration step is critically dependent on the stability of the fixing of cocatalyst and catalyst to She support. The better a metallocene or an alkylaluminum is fixed to the support, the lower the residual catalyst or residual cocatalyst content in the filtered cycloolefin copolymer solution.

The object was to provide a supported catalyst system having more stable catalyst and/or cocatalyst fixing and thus a better service life.

It has now been found that this object can be achieved by a supported catalyst system which comprises a support, at least one catalyst and at least one cocatalyst, wherein the fixing of the catalyst to the support is carried out under the action of microwaves.

The catalyst is preferably brought into contact with a supported catalyst in a suspension solution under the action of microwaves.

In an embodiment of the invention, the catalyst is brought into contact with the cocatalyst by combining the cocatalyst-coated support material suspended in a suspending medium with a catalyst compound dissolved in an inert solvent.

In another embodiment of the invention, the catalyst is brought into contact with the cocatalyst by combining the cocatalyst-coated support material suspended in a suspending medium with a catalyst compound in solid form.

In a further embodiment of the invention, the catalyst is brought into contact with the cocatalyst by combining the catalyst dissolved in an inert solvent with the solid of the cocatalyst-coated support material to give a suspension.

The cocatalyst-coated support material can be prepared as described, for example, in European Patent Application EP-92107331.8. Even in this first supporting step, however, microwave treatment analogously to the procedure described here is possible. This treatment can also be omitted without any significant impairment of the supporting being evident if instead the microwave treatment during the catalyst fixing is intensified.

The cocatalyst-coated support material can be employed as a 1–40% strength by weight, preferably as a 5–20% strength by weight, suspension in an aliphatic, inert suspending medium, such as n-decane, hexane, heptane or diesel oil.

Suitable solvents for the catalyst are inert solvents which have only weak microwave-active bands, or none at all, in the wavelength range of the microwave unit (Klystron) employed, for example toluene, hexane, heptane or dichloromethane.

The reaction between catalyst and supported cocatalyst can be carried out with vigorous mixing of the components, for example by stirring at a molar Al/Zr ratio of between 100/1 and 10.000/1, preferably between 100/1 and 3000/1, under inert conditions, i.e. under a nitrogen or argon atmosphere.

The catalyst can first be brought into contact with the cocatalyst-coated support material with stirring at a relatively low temperature of between −80° C. and +30° C., preferably at from −10° C. to −40° C. The homogeneous suspension formed by the stirring can subsequently be irradiated with microwaves at a temperature between −20° and +120° C., preferably between 15° and 100° C. The irradiation is accompanied by warming of the reaction suspension. The temperature gradient as far as a defined final temperature, at which the system can be kept for a variable period, is set via the microwave output.

The irradiation duration and the associated warming depend on the microwave output and on the amount of substance. It is selected, for example, so that a final temperature of 50°–120° C., preferably 70°–100° C., is not exceeded and this is reached within one hour, preferably within a few minutes. The reaction of catalyst and supported cocatalyst takes place during the irradiation for a reaction time of between 5 and 120 minutes, preferably 10–80 minutes. The microwave apparatus allows both the possibility of irradiation of defined, stirred batches under inert-gas conditions and irradiation of continuously conveyed suspensions.

The frequency of the microwaves can be in the range from 0.4 GHz to 24 GHz, preferably from 0.4 to 2.5 GHz, and in particular can be at about 433 MHz, about 915 MHz and about 2.45 GHz. Preference is given to pulsed microwave radiation.

In experiments in which various hydrocarbon solutions were treated with microwaves, it was clearly shown that, in contrast to pure hydrocarbons, for example alkylaluminum compounds, in particular alkylmethylaluminum compounds, and metallocenes absorb microwaves. This means that, in the case of supporting using irradiation with microwaves, energy can be transferred in a targeted manner to the compounds to be supported. The excited compounds to be supported also distribute this energy to the environment in the form of heat. Good fixing is thus achieved. A temperature which correlates to the energy introduced and absorbed can be measured in the medium in which supporting is carried out (solvent). The temperature of the medium can thus be used to describe the supporting experiments. The amount of radiation energy introduced also depends on the concentrations of the excitable components of the catalyst system to he supported.

Examples of suitable support materials are silica gels, aluminum oxides, solid aluminoxane or other inorganic support materials, such as, for example, magnesium chloride or oxides prepared by flame pyrolysis by combustion of elemental halides in an oxyhydrogen gas flame, or can be prepared as silica gels in certain particle size distributions and particle shapes.

Another suitable support material is partially crystalline or crosslinked polyolefin powder in finely divided form which is insoluble under the reaction conditions.

During the reaction time for the preparation of the supported catalyst system according to the invention, changes occur in the color of the reaction mixture, in particular if metallocenes having absorption maxima in the visible region are used, which can be used to monitor the progress of the reaction.

The quality of the fixing of the catalyst system can be tested by bench experiments. Various tests can be used. A considerable amount of information is also obtained from test polymerizations of propylene. In these, the supported catalyst systems are kept under reaction conditions, but come into contact with inert hydrocarbons instead of with propylene. After certain times, catalyst samples are taken and used for a test polymerization. A time-dependent change in the catalyst system can thus be observed and assessed.

When the reaction time is complete, the supernatant solution can be separated off, for example by filtration or decantation. The filtrate of the reaction suspension is colored depending on the catalyst employed previously. The solid which remains is washed with 1 to 5 times the amount of an inert suspending medium, such as toluene, n-decane, hexane, diesel oil or dichloromethane, in order to remove soluble constituents in the supported catalyst system formed, in particular in order to remove unreacted and thus soluble metallocene.

The supported catalyst system prepared in this way can be resuspended, for example either as a powder after drying in vacuo or in a stream of inert gas or still containing solvent, and metered into the polymerization system as a suspension in an inert suspending medium, such as, for example, hexane, heptane or diesel oil.

In order to carry out a polymerization reaction, the addition of the supported catalyst system according to the invention into the reactor space can also be preceded by addition of at least one cocatalyst.

The supported catalyst systems according to the invention can be used for the synthesis of polyolefins, for example of homopolymers and copolymers of olefins of the formula Ra—CH=CH—Rb, in which Ra and Rb are identical or different and are a hydrogen atom or a hydrocarbon radical having 1 to 14 carbon atoms, or Ra and Rb, together with the atoms connecting them, can form one or more rings. Preference is given to polyethylene and polypropylene.

In addition, the supported catalyst systems according to the invention can be used for the synthesis of cycloolefin copolymers. Particular preference is given to cycloolefin copolymers obtained by polymerization of at least one polycyclic olefin of the formula I, II, III or IV, preferably a cycloolefin of the formula I or III,

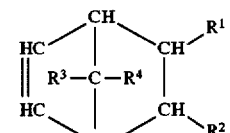

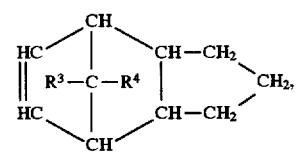

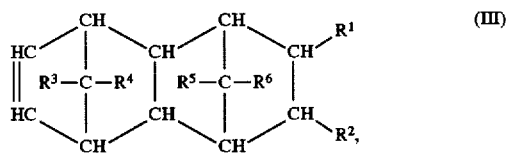

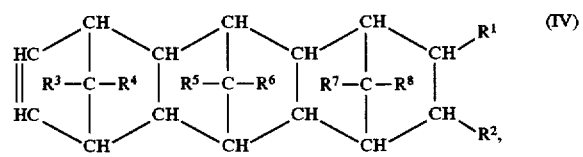

in which $R^1$, $R^2$, $R^3$, $R^4$, $R^5$, $R^6$, $R^7$ and $R^8$ are identical or different and are a hydrogen atom or a $C_1$–$C_8$-alkyl radical or a $C_1$–$C_{16}$-aryl radical, where identical radicals in the various formulae can have different meanings, if desired also a monocyclic olefin of the formula V

in which n is a number from 2 to 10, and an acyclic 1-olefin of the formula VI

in which $R^9$, $R^{10}$, $R^{11}$ and $R^{12}$ are identical or different and are a hydrogen atom or a $C_1$–$C_8$-alkyl radical, which may also contain a double bond, or a $C_6$–$C_{16}$-aryl radical. Preference is given to ethylene, propylene, butene, hexene, octene or styrene. Particular preference is given to ethene. In addition, dienes may also be employed.

In particular, copolymers of polycyclic olefins of the formula I and II are prepared.

The polycyclic olefin (I to IV) is employed in an amount of from 0.1 to 99.9% by weight, the monocyclic olefin (V) is employed in an amount of from 0 to 99.9% by weight, and the acyclic 1-olefin (VI) is employed in an amount of from 0.1 to 99.9% by weight, in each case based on the total amount of the monomers.

The monomers are preferably employed in the following mixing ratios:

a) the molar polycyclic olefin (I to IV): 1-olefin (VI) monomer ratio in the corresponding polymers is from 1:99 to 99:1, preferably from 20:80 to 80:20;

b) in the case of polymers made from polycyclic olefins (I to IV) and monocyclic olefins (V), the molar polycyclic olefin:monocyclic olefin ratio is from 10:90 to 90:10;

c) in the case of polymers made from polycyclic olefins (I to IV), monocyclic olefins (V) and 1-olefins (VI), the molar polycyclic olefin: monocyclic olefin:1-olefin monomer ratio is from 93:5:2 to 5:93:2 to 5:5:90, i.e. the molar ratio is within a mixture triangle whose corners are defined by the molar ratios 97:1:2, 5:93:2 and 5:1:94;

d) in a), b) and c), polycyclic olefins, monocyclic olefins and 1-olefins are also taken to mean mixtures of two or more olefins of the respective type.

The supported catalyst systems according to the invention contain a catalyst system which preferably comprises at least one aluminoxane as cocatalyst and at least one metallocene as catalyst.

The metallocene is preferably a compound of the formula IX

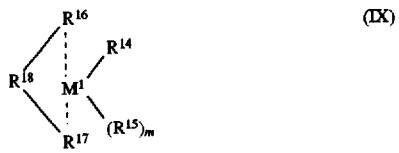

in which $M^1$ is a metal from the group consisting of titanium, zirconium, hafnium, vanadium, niobium and tantalum, preferably zirconium and hafnium, $M^2$ is silicon, germanium or tin, preferably silicon or germanium, $R^{14}$ and $R^{15}$ are identical or different and are a hydrogen atom, a $C_1-C_{10}$-, preferably $C_1-C_3$-alkyl group, a $C_1-C_{10}$-, preferably $C_1-C_3$-alkoxy group, a $C_6-C_{10}$-, preferably $C_6-C_8$-aryl group, a $C_6-C_{10}$-, preferably $C_6-C_8$-aryloxy group, a $C_2-C_{10}$-, preferably $C_2-C_4$-alkenyl group, a $C_7-C_{40}$-, preferably $C_7-C_{10}$-arylalkyl group, a $C_7-C_{40}$-, preferably $C_7-C_{12}$-alkylaryl group, a $C_8-C_{40}$-, preferably $C_8-C_{12}$-arylalkenyl group, or a halogen atom, preferably chlorine, m may be one or two, depending on the valency of the central atom $M^1$, $R^{16}$ and $R^{17}$ are identical or different and are a monocyclic or polycyclic hydrocarbon radical which, together with the central atom $M^1$, can form a sandwich structure, where $R^{16}$ and $R^{17}$ are preferably, independently of one another, indenyl, cyclopentadienyl or fluorenyl, which may be substituted by various hydrocarbon radicals, $R^{18}$ is a single- or multimembered bridge which links the radicals $R^{16}$ and $R^{17}$ and is

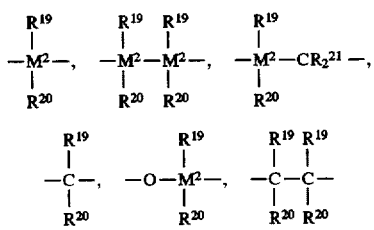

$=BR^{19}$, $=AlR^{19}$, —Ge—, —Sn—, —O—, —S—, =SO, $=SO_2$, $=NR^{19}$, —CO, $=PR^{19}$ or $=P(O)R^{19}$, where $R^{19}$, $R^{20}$ and $R^{21}$ are identical or different and are a hydrogen atom, a halogen atom, preferably chlorine, a $C_1-C_{10}$-, preferably $C_1-C_3$-alkyl group, in particular a methyl group, a $C_1-C_{10}$-fluoroalkyl group, preferably a $CF_3$ group, a $C_6-C_{10}$-fluoroaryl group, preferably a pentafluorophenyl group, a $C_6-C_{10}$-, preferably a $C_6-C_8$-aryl group, a $C_1-C_{10}$-, preferably $C_1-C_4$-alkoxy group, in particular a methoxy group, a $C_2-C_{10}$-, preferably $C_2-C_4$-alkenyl group, a $C_7-C_{40}$-, preferably a $C_7-C_{10}$-arylalkyl group, a $C_8-C_{40}$-, preferably $C_8-C_{12}$-arylalkenyl group or a $C_7-C_{40}$-, preferably $C_7-C_{12}$-alkylaryl group, or $R^{19}$ and $R^{20}$ or $R^{19}$ and $R^{21}$, in each case together with the atoms connecting them, form a ring.

$R^{18}$ is preferably $=CR^{19}R^{20}$, $=SiR^{19}R^{20}$, $=GeR^{19}R^{20}$, —O—, —S—, =SO, $=PR^{19}$ or $=P(O)R^{19}$, in which $R^{19}$ and $R^{20}$ are preferably a $C_1-C_{10}$-, preferably $C_1-C_4$-alkyl group or a $C_6-C_{10}$-aryl group.

The metallocenes can be prepared as described in, for example, EP-A 0 355 682.

Preferred metallocenes are:
biscyclopentadienylzirconium dichloride
biscyclopentadienyldimethylzirconium
biscyclopentadienyldiphenylzirconium
biscyclopentadienyldibenzylzirconium
biscyclopentadienylbistrimethylsilylzirconium
bis(methylcyclopentadienyl)zirconium dichloride
bis(1,2-dimethylcyclopentadienyl)zirconium dichloride
bis(1,3-dimethylcyclopentadienyl)zirconium dichloride
bis(1,2,4-trimethylcyclopentadienyl)zirconium dichloride
bis(pentamethylcyclopentadienyl)zirconium dichloride
bis(ethylcyclopentadienyl)zirconium dichloride
bis(propylcyclopentadienyl)zirconium dichloride
bis(butylcyclopentadienyl)zirconium dichloride
bisfluorenylzirconium dichloride
bisindenylzirconium dichloride
diphenylmethylene(9-fluorenyl)(cyclopentadienyl)zirconium dichloride
diphenylmethylene(9-fluorenyl)(cyclopentadienyl)hafnium dichloride
dimethylsilylbis(cyclopentadienyl)zirconium dichloride
dimethylsilyl(9-fluorenyl)(cyclopentadienyl)zirconium dichloride
dimethylsilyl(9-fluorenyl)(cyclopentadienyl)hafnium dichloride
isopropylidene(9-fluorenyl)(cyclopentadienyl)zirconium dichloride
isopropylidene(9-fluorenyl)(cyclopentadienyl)hafnium dichloride
dimethylsilylbis(9-fluorenyl)zirconium dichloride
dimethylsilylbis-1-tetrahydroindenylzirconium dichloride
dimethylsilylbis-1-(2-methyltetrahydroindenyl)zirconium dichloride
dimethylsilylbis-1-(2,3,5-trimethylcyclopentadienyl)zirconium dichloride
dimethylsilylbis-1-(2,3-dimethylcyclopentadienyl)zirconium dichloride
dimethylsilylbis-1-indenylzirconium dichloride
dimethylsilylbis-1-indenyldimethylzirconium
dimethylgermylbis-1-indenylzirconium dichloride
dimethylsilylbis-1-(2-methylindenyl)zirconium dichloride
dimethylsilylbis-1-(2-methyl-4-isopropylindenyl)zirconium dichloride
phenylmethylsilylbis-1-(2-methylindenyl)zirconium dichloride
dimethylsilylbis-1-(2-methyl-4-ethylindenyl)zirconium dichloride
ethylenebis-1-(4,7-dimethylindenyl)zirconium dichloride
phenyl(methyl)silylbis-1-indenylzirconium dichloride
phenyl(vinyl) silylbis-1-indenylzirconium dichloride
diphenylsilylbis-1-indenylzirconium dichloride
dimethylsilylbis-1-(2-methyl-4-tert-butylindenyl)zirconium dichloride
methylphenylsilylbis-1-(2-methyl-4-isopropylindenyl)zirconium dichloride
dimethylsilylbis-1-(2-ethyl-4-methylindenyl)zirconium dichloride
dimethylsilylbis-1-(2,4-dimethylindenyl)zirconium dichloride
dimethylsilylbis-1-(2-methyl-4-ethylindenyl) dimethylzirconium
dimethylsilylbis-1-(2-methyl-4,6-diisopropylindenyl)zirconium dichloride dimethylsilylbis-1-(2,4,6-trimethylindenyl)zirconium dichloride
methylphenylsilylbis-1-(2-methyl-4,6-diisopropylindenyl) zirconium dichloride
1,2-ethanediylbis-1-(2-methyl-4,6-diisopropylindenyl) zirconium dichloride
dimethylsilylbis-1-(2-methyl-4,5-benzoindenyl) zirconium dichloride
dimethylsilylbis-1-(2-methyl-4-phenylindenyl)zirconium dichloride
ethylenebis(1-indenyl)zirconium dichloride
ethylenebis-1-(4,5,6,7-tetrahydroindenyl)zirconium dichloride
ethylenebis(1-indenyl)hafnium dichloride
dimethylsilylbis-1-(4,5-benzoindenyl)zirconium dichloride
isopropyl(cyclopentadienyl) (1-indenyl)zirconium dichloride
isopropyl(3-methylcyclopentadienyl)(1-indenyl)zirconium dichloride
dimethylsilyl(cyclopentadienyl)(1-indenyl)zirconium dichloride
dimethylsilylbis(3-methylcyclopentadienyl)zirconium dichloride
dimethylsilylbis(2,4-dimethylcyclopentadienyl) zirconium dichloride
methylethylenebis(1-indenyl)zirconium dichloride
methylphenylcarbyl(9-fluorenyl) (cyclopentadienyl) zirconium dichloride
diphenylsilyl(9-fluorenyl) (cyclopentadienyl)zirconium dichloride
dimethylsilyl(9-(2,7-di-tert-butylfluorenyl)) (cyclopentadienyl)zirconium dichloride
diphenylcarbyl(9-(2,7-di-tert-butylfluorenyl)) (cyclopentadienyl)zirconium dichloride
isopropyl(9-(2,7-di-tert-butylfluorenyl)) (cyclopentadienyl) zirconium dichloride
isopropyl(9-fluorenyl) (1-(3-methylcyclopentadienyl)) zirconium dichloride
isopropyl(9-fluorenyl) (1-(3-isopropylcyclopentadienyl)) zirconium dichloride
dimethylsilyl(9-fluorenyl) (1-(3-methylcyclopentadienyl)) zirconium dichloride
dimethylsilyl(9-fluorenyl) (1-(3-isopropylcyclopentadienyl))zirconium dichloride
isopropyl(9-fluorenyl) (1-indenyl)zirconium dichloride
dimethylsilyl(9-fluorenyl) (1-indenyl)zirconium dichloride Chiral metallocenes are preferably employed as the racemate in the preparation of the catalyst system according to the invention. However, it is also possible to use the pure R or S form. In the case of the preparation of highly tactic polyolefins, the meso form of the metallocenes should be separated off therefrom before use. The central atom of the metallocenes is preferably zirconium or hafnium, particularly preferably zirconium.

Particularly preferred metallocenes are:
biscyclopentadienylzirconium dichloride
bisindenylzirconium dichloride
diphenylmethylene(9-fluorenyl) (cyclopentadienyl) zirconium dichloride
dimethylsilylbis(cyclopentadienyl)zirconium dichloride
dimethylsilyl(9-fluorenyl) (cyclopentadienyl)zirconium dichloride
isopropylidene(9-fluorenyl) (cyclopentadienyl)zirconium dichloride
dimethylsilylbis-1-indenylzirconium dichloride
diphenylsilylbis-1-indenylzirconium dichloride
ethylenebis-(1-indenyl)zirconium dichloride
isopropyl(cyclopentadienyl) (1-indenyl)zirconium dichloride
isopropyl(3-methylcyclopentadienyl) (1-indenyl)zirconium dichloride
dimethylsilyl(cyclopentadienyl) (1-indenyl)zirconium dichloride
methylphenylcarbyl(9-fluorenyl) (cyclopentadienyl) zirconium dichloride
isopropyl(9-fluorenyl) (1-(3-methylcyclopentadienyl) zirconium dichloride
isopropyl(9-fluorenyl) (1-(3-isopropylcyclopentadienyl)) zirconium dichloride The cocatalyst is preferably an aluminoxane, preferably of the formula VII

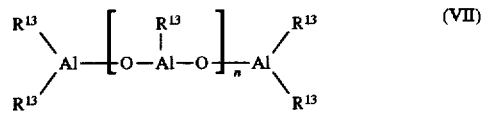

for the linear type and/or of the formula VIII

for the cyclic type, where, in the formulae VII and VIII, $R^{13}$ is a $C_1$–$C_6$-alkyl group, preferably methyl, ethyl, isobutyl, butyl or neopentyl, or phenyl or benzyl, particularly preferably methyl, and n is an integer from 2 to 50, preferably from 5 to 40. However, the precise structure of the aluminoxane is unknown. The aluminoxane can be prepared in various ways, as described, for example, in European Patent EP-A 0 355 682.

Further catalyst systems which can be prepared using the supporting process described here are the systems described in European Patent Applications EP-92107331.8, EP-93100891.6 and EP-93101116.7 and in German Patent Application P 42 10 780.6. Express reference is hereby made to these patent applications.

The polymerization is carried out in a known manner in solution, in suspension, in the liquid cycloolefin monomer or cycloolefin monomer mixture or in the gas phase, continuously or batchwise, in one or more steps, at a temperature of from −78° to 150° C., preferably from −20° to 80° C. The pressure is from 0.5 to 64 bar and is obtained either by the gaseous olefins or with the aid of inert gas. The concentrations of the catalysts and cocatalysts employed and the detailed experimental conditions for carrying out the polymerization reaction are described, for example, in European Patent Application EP-A 0 336 128, to which express reference is hereby made.

In the case of the cycloolefin copolymers, virtually all of which are dissolved under the polymerization conditions, it can be assumed that the polymer formed goes directly into solution during the polymerization with the supported catalyst system, and thus does not include the catalyst particle or impair the further polymerization at the particle surface.

The advantage of the process according to the invention over the prior art consists in that the irradiation with microwaves causes targeted excitation of the components of the catalyst system during the fixing of the catalyst and/or cocatalyst, resulting in preferential warming of the reacting components. However, in the case of the energy supply customary hitherto by heat, for example by a heating bath, essentially the solvent is warmed, which results in relatively low effectiveness of the supporting process.

With the aid of the catalyst system according to the invention, it is possible, for example, to prepare very pure and very transparent cycloolefin copolymers which can be converted into optical parts and elements in the area of high-performance optics, light propagation and optical information storage.

EXAMPLES

For the experiments with the supported aluminum compound (methylaluminoxane on silica gel), referred to below as "MAO on SiO$_2$, type A", an approximately 10% strength by weight suspension in n-decane was prepared, containing 60 mg of Al/ml according to aluminum determination.

In addition, a solvent-free supported methylaluminoxane on silica gel, referred to below as "MAO on SiO$_2$, type B", was prepared, containing 20% (by weight) of aluminum in the solid.

The following abbreviations are used:
VI=viscosity index in cm$^3$/g
Mw=weight average molecular weight in g/mol (determined by gel permeation chromatography)
Mw/Mn=molecular weight dispersity
m.p.=melting point in ° C. (determined by DSC, heating/cooling rate 20° C./min)
II=isotactic index (II=mm+½ mr, determined by $^{13}$C-NMR spectroscopy)
MFI(230/5)=melt flow index, measured in accordance with DIN 53735, in dg/min
BD=polymer bulk density in g/dm$^3$.

Example 1

5.08 g of "MAO on SiO$_2$, type B" are suspended in 60 ml of toluene in a mechanically stirrable vessel and cooled to −30° C. Simultaneously, 98 mg (152 μmol) of rac-dimethylsilylbis-1-(4,6-isopropyl-2-methylindenyl) zirconium dichloride are dissolved in 40 ml of toluene and added dropwise to the suspension. The cold reaction mixture is introduced into a microwave apparatus. The mixture is warmed to 80° C. over the course of 15 minutes with stirring in a stream of inert gas at a microwave frequency of 2.45 GHz and a microwave output of 500 W, the suspension taking on a red color. The radiation output is adjusted so the suspension is kept at this temperature for one hour (250 W, pulsed). The mixture is subsequently filtered, and the red solid is washed three times with 50 ml of toluene. Analysis of the yellow filtrate gives a zirconium content of 0.7 mg (corresponding to 5 mg of rac-dimethylsilylbis-1-(4,6isopropyl-2-methylindenyl)-zirconium dichloride). The solid is dried in vacuo, giving 4.7 g of free-flowing, pale red, supported catalyst containing 19.8 mg of zirconocene per gram of catalyst.

Example 2: (Comparative Example)

13 ml of the suspension of "MAO on SiO$_2$, type A" (29 mmol of Al) was introduced under argon into a G3 Schlenk frit, and a solution of 3.3 mg of rac-dimethylsilylbis-1-(4,6-isopropyl-2-methylindenyl) zirconium dichloride in 10 ml of toluene (5.1 μmol of Zr) was added. The reaction mixture was stirred at room temperature for 30 minutes, during which a spontaneous color change to red gradually faded. The mixture was subsequently filtered, and the solid was washed 3 times with 10 ml of hexane. The supported catalyst was obtained as a hexane-moist filter residue.

Example 3

The preparation of the supported catalyst is repeated analogously to Example 1 with the difference that 65 mg (0.15 mmol) of isopropyl (9-fluorenyl)cyclopentadienylzirconium dichloride are dissolved in 40 ml of toluene and added dropwise to the suspension of 3.9 g of "MAO on SiO$_2$, type B" in 60 ml of toluene. Analysis of the pale-red filtrate gives a zirconium content of 0.9 mg (corresponding to 4.3 mg of isopropyl-(9-fluorenyl) cyclopentadienylzirconium dichloride). 3 g of free-flowing, violet, supported catalyst containing 20 mg of zirconocene per gram of catalyst are obtained.

Example 4 (Comparative Example)

20 ml of the suspension of "MAO on SiO$_2$, type A" (45 mmol of Al) were introduced under argon into a G3 Schlenk frit, and a solution of 4.2 mg of isopropyl(9-fluorenyl)-cyclopentadienylzirconium dichloride in 10 ml of toluene (9.7 μmol of Zr) was added. The reaction mixture was stirred at room temperature for 30 minutes, during which a spontaneous color change to violet gradually faded. The mixture was subsequently filtered, and the solid was washed 3 times with 10 ml of hexane. The supported catalyst was obtained as a hexane-moist filter residue.

Example 5

0.98 g of the supported catalyst prepared as in Example 1 were resuspended in 50 ml of hexane for the polymerization.

Polymerization:

In parallel, a dry 16 dm$^3$ reactor was flushed first with nitrogen and subsequently with propylene and charged with 10 dm$^3$ of liquid propylene. 3 cm$^3$ of triisobutylaluminum (pure, 12 mmol) were then diluted with 30 ml of hexane and introduced into the reactor, and the batch was stirred at 30° C. for 15 minutes. The pre-prepared catalyst suspension was then introduced into the reactor and heated to the polymerization temperature of 70° C. (4° C./min) by supply of heat, and the polymerization system was kept at 70° C. for 1 hour by cooling. During the polymerization experiment, the heat of reaction remained constant after the polymerization temperature of 70° C. had been reached, i.e. no drop in activity and associated change in the temperature in the cooling circuit of the reactor was noted. The polymerization was terminated by addition of 20 ml of isopropanol. The excess monomer was removed in gas form, and the polymer was dried in vacuo, giving 720 g of polypropylene powder. There were no deposits on the inside wall or stirrer of the reactor. The catalyst activity was thus 37 kg of PP/g of metallocene×h.

VI=311 cm$^3$/g; m.p.=140° C.; MFI 230/5=7.5 dg/min.

Example 6

1.17 g of the catalyst prepared as in Example 1 are resuspended in 50 ml of hexane for the polymerization. The polymerization is carried out analogously to Example 5, but the polymerization lasts 2 hours. In the polymerization experiment, the heat of reaction remains constant after the polymerization temperature of 70° C. has been reached, i.e. no drop in activity and associated change in the temperature in the cooling circuit of the reactor is noted.

1600 g of polypropylene powder result. There are no deposits on the inside wall or stirrer of the reactor.

The catalyst activity is thus 34.5 kg of PP/g of metallocene×h.

VI=341 cm$^3$/g; m.p.=141° C.; Mw=330.000 g/mol; Mw/Mn=2.8; MFI 230/5=5.5 dg/min; BD=350 g/dm$^3$.

Example 7

0.58 g of the catalyst prepared as in Example 1 are resuspended in 50 ml of hexane for the polymerization. The polymerization is carried out analogously to Example 5, but the polymerization lasts 3 hours. In the polymerization experiment, the heat of reaction remains constant after the reaction temperature of 70° C. has been reached, i.e. no drop in activity and associated change in the temperature in the cooling circuit of the reactor is noted.

1150 g of polypropylene powder result. There are no deposits on the inside wall-or stirrer of the reactor.

The catalyst activity is thus 33 kg of PP/g of metallocene×h.

VI=281 cm$^3$/g; m.p.=141° C.; MFI 230/5=5.5 dg/min; BD=370 g/dm$^3$.

Example 8 (Comparative Example)

The catalyst prepared as in Example 2 was resuspended in hexane-moist form in 20 ml of hexane. The polymerization was carried out analogously to Example 5. During the polymerization experiment, the heat of reaction did not remain constant after the polymerization temperature of 70° C. had been reached, i.e. a drop in activity and the associated change in the temperature in the cooling circuit of the reactor were noted. It was therefore only possible to calculate a mean catalyst activity. 250 g of very fine polypropylene powder resulted. Thin coatings were evident on the inside wall and stirrer of the reactor.

The (mean) catalyst activity was thus 76 kg of PP/g of metallocene×h.

VI=324 cm$^3$/g; m.p.=143° C.; Mw=431,000 g/mol; Mw/Mn=2.6; MFI 230/5=3.5 dg/min; BD=110 g/dm$^3$.

Example 9 (Comparative Example)

The catalyst prepared as in Example 2 was resuspended in hexane-moist form in 20 ml of hexane. The polymerization was carried out analogously to Example 5, but the polymerization lasted three hours at 70° C. During the polymerization experiment, the heat of reaction did not remain constant after the polymerization temperature of 70° C. had been reached, i.e. a drop in activity and the associated change in the temperature in the cooling circuit of the reactor were noted. It was therefore only possible to calculate a mean catalyst activity. 340 g of polypropylene powder resulted. There was some evidence of a coating on the inside wall and stirrer of the reactor. The (mean) catalyst activity was thus 30 kg of PP/g of metallocene×h.

VI=275 cm$^3$/g; m.p.=139° C.; MFI 230/5=6.5 dg/min.

Example 10

A clean and dry 1.5 l polymerization reactor fitted with stirrer was flushed first with nitrogen and then with ethylene. The reactor was charged with 600 ml of a toluene solution of norbornene (411 g of norbornene and 86 ml of toluene).

2 ml of a 20% strength by weight toluene solution of tri(n-butyl)aluminum were added to the solution. The temperature in the reactor was subsequently adjusted 70° C. and the ethylene pressure to 6 bar. 210 mg of the catalyst powder prepared as in Example 3 were suspended in 10 ml of dry hexane in a 25 ml Schlenk vessel. This suspension was added to the reactor via a transfer tube, and the ethylene pressure was kept constant at 6 bar for 60 minutes by reinjection of ethylene. The ethylene take-up was monitored continuously by means of a Brooks mass flow meter. The take-up of ethylene was virtually constant at 9 l/h (standard liters/hour) over the duration of the polymerization.

The polymerization was terminated after 60 minutes by addition of 100 ml of a water-moist (saturated at room temperature) toluene. The reactor contents were then filtered through a 3 l suction filter heated to 70° C. and containing a Seitz T5500 filter layer, at an excess pressure in the filter of 2.5 bar, over the course of 4 minutes. A clear solution was obtained. The solution was subsequently precipitated in 5 l of acetone and washed with 3 l of acetone. The precipitated powder was dried at 100° C. and 0.2 bar for 15 hours.

A total of 51.4 g of norbornene-ethylene copolymer were obtained. The glass transition temperature was 154° C. and the viscosity index (solution viscosity) was 180 ml/g.

Example 11

The procedure was analogous to Example 10, but all the hexane-moist filter residue produced in a catalyst preparation as in Example 4 was resuspended in 10 ml of dry hexane and then employed in .the polymerization. The take-up of ethylene was 9.3 l/h at the beginning of the polymerization, but fell significantly to 6.7 l/h over the course of 60 minutes.

The filtration carried out under the same conditions as in Example 9 took 18 minutes.

44.6 g of product were obtained. The glass transition temperature was 152° C. and the viscosity index was 169 ml/g.

Example 12 (Bench Experiment)

1 g of the dried catalyst from Example 3 is suspended in 50 ml of hexane for the polymerization. The polymerization is carried out analogously to Example 5, giving 600 g of coarse polypropylene powder. There are no deposits on the inside wall or stirrer of the reactor. The catalyst activity is thus 30 kg of PP/g of metallocene×h.

Example 13

1 g of the dried catalyst from Example 3 is suspended in 100 ml of toluene which has been rendered absolute and saturated with inert gas. The suspension is heated at 80° C. for three hours under a protective gas. After cooling to room temperature, the mixture is filtered through a G3 frit. The filtrate is colorless. The violet filter residue is washed with hexane and subsequently suspended in 50 ml of hexane for the polymerization. The polymerization is carried out analogously to Example 5, giving 530 g of coarse polypropylene powder. There are no deposits on the inside wall or stirrer of the reactor. The catalyst activity is thus 26.5 kg of PP/g of metallocene×h.

Example 14 (Comparative Example)

The hexane-moist filter residue of the catalyst system prepared as in Example 4 is suspended in 50 ml of hexane for the polymerization. The polymerization is carried out analogously to Example 5, giving 250 g of fine polypropylene powder. There are no deposits on the inside wall or stirrer of the reactor. The catalyst activity is thus 60 kg of PP/g of metallocene×h.

Example 15 (Comparative Example)

The hexane-moist filter residue of the catalyst system prepared as in Example 4 is suspended in 100 ml of toluene which has been rendered absolute and saturated with inert gas. The suspension is heated at 80° C. for three hours under a protective gas. After cooling to room temperature, the mixture is filtered through a G3 frit. The filtrate is red. The filter residue is washed with hexane and subsequently suspended in 50 ml of hexane for the polymerization. The polymerization is carried out analogously to Example 5. No polypropylene powder is obtained.

We claim:

1. A supported catalyst system comprising support, at least one metallocene catalyst fixed to the support, and at least one cocatalyst, wherein the catalyst is fixed to the support by bringing the catalyst into contact with a supported cocatalyst in a suspension and by irradiating with microwaves.

2. A supported catalyst system as claimed in claim 1, wherein the cocatalyst is at least one aluminoxane.

3. A supported catalyst system as claimed in claim 1 wherein the metallocene used is
biscyclopentadienylzirconium dichloride
biscyclopentadienyldimethylzirconium
biscyclopentadienyldiphenylzirconium
biscyclopentadienyldibenzylzirconium
biscyclopentadienylbistrimethylsilylzirconium
bis(methylcyclopentadienyl)zirconium dichloride
bis(1,2-dimethylcyclopentadienyl)zirconium dichloride
bis(1,3-dimethylcyclopentadienyl)zirconium dichloride
bis(1,2,4-trimethylcyclopentadienyl)zirconium dichloride
bis(pentamethylcyclopentadienyl)zirconium dichloride
bis(ethylcyclopentadienyl)zirconium dichloride
bis(propylcyclopentadienyl)zirconium dichloride
bis(butylcyclopentadienyl)zirconium dichloride
bisfluorenylzirconium dichloride
bisindenylzirconium dichloride
diphenylmethylene(9-fluorenyl) (cyclopentadienyl) zirconium dichloride
diphenylmethylene(9-fluorenyl) (cyclopentadienyl)hafnium dichloride
dimethylsilylbis(cyclopentadienyl)zirconium dichloride
dimethylsilyl(9-fluorenyl) (cyclopentadienyl)zirconium dichloride
dimethylsilyl(9-fluorenyl) (cyclopentadienyl)hafnium dichloride
isopropylidene(9-fluorenyl) (cyclopentadienyl)zirconium dichloride
isopropylidene(9-fluorenyl) (cyclopentadienyl)hafnium dichloride
dimethylsilylbis(9-fluorenyl)zirconium dichloride
dimethylsilylbis-1-tetrahydroindenylzirconium dichloride
dimethylsilylbis-1-(2-methyltetrahydroindenyl)zirconium dichloride
dimethylsilylbis-1-(2,3,5-trimethylcyclopentadienyl) zirconium dichloride
dimethylsilylbis-1-(2,3-dimethylcyclopentadienyl) zirconium dichloride
dimethylsilylbis-1-indenylzirconium dichloride
dimethylsilylbis-1-indenyldimethylzirconium
dimethylgermylbis-1-indenylzirconium dichloride
dimethylsilylbis-1-(2-methylindenyl)zirconium dichloride
dimethylsilylbis-1-(2-methyl-4-isopropylindenyl)zirconium dichloride
phenylmethylsilylbis-1-(2-methylindenyl)zirconium dichloride
dimethylsilylbis-1-(2-methyl-4-ethylindenyl)zirconium dichloride
ethylenebis-1-(4,7-dimethylindenyl)zirconium dichloride
phenyl(methyl)silylbis-1-indenylzirconium dichloride
phenyl(vinyl)silylbis-1-indenylzirconium dichloride
diphenylsilylbis-1-indenylzirconium dichloride
dimethylsilylbis-1-(2-methyl-4-tert-butylindenyl)zirconium dichloride
methylphenylsilylbis-1-(2-methyl-4-isopropyl-indenyl) zirconium dichloride
dimethylsilylbis-1-(2-ethyl-4-methylindenyl)zirconium dichloride
dimethylsilylbis-1-(2,4-dimethylindenyl)zirconium dichloride
dimethylsilylbis-1-(2-methyl-4-ethylindenyl) dimethylzirconium
dimethylsilylbis-1-(2-methyl-4,6-diisopropylindenyl) zirconium dichloride
dimethylsilylbis-1-(2,4,6-trimethylindenyl)zirconium dichloride
methylphenylsilylbis-1-(2-methyl-4,6-diisopropyl-indenyl) zirconium dichloride
1,2-ethanediylbis-1-(2-methyl-4,6-diisopropyl-indenyl) zirconium dichloride
dimethylsilylbis-1-(2-methyl-4,5-benzoindenyl)zirconium dichloride
dimethylsilylbis-1-(2-methyl-4-phenylindenyl)zirconium dichloride
ethylenebis(1-indenyl)zirconium dichloride
ethylenebis-1-(4,5,6,7-tetrahydroindenyl)zirconium dichloride
ethylenebis(1-indenyl)hafnium dichloride
dimethylsilylbis-1-(4,5-benzoindenyl)zirconium dichloride
isopropyl(cyclopentadienyl)(1-indenyl)zirconium dichloride
isopropyl(3-methylcyclopentadienyl)(1-indenyl)zirconium dichloride
dimethylsilyl(cyclopentadienyl)(1-indenyl)zirconium dichloride
dimethylsilylbis(3-methylcyclopentadienyl)zirconium dichloride
dimethylsilylbis(2,4-dimethylcyclopentadienyl)zirconium dichloride
methylethylenebis(1-indenyl)zirconium dichloride
methylphenylcarbyl(9-fluorenyl)(cyclopentadienyl) zirconium dichloride
diphenylsilyl(9-fluorenyl)(cyclopentadienyl)zirconium dichloride
dimethylsilyl(9-(2,7-di-tert-butylfluorenyl)) (cyclopentadienyl)zirconium dichloride
diphenylcarbyl(9-(2,7-di-tert-butylfluorenyl)) (cyclopentadienyl)zirconium dichloride
isopropyl(9-(2,7-di-tert-butylfluorenyl)) (cyclopentadienyl) zirconium dichloride
isopropyl(9-fluorenyl) (1-(3-methylcyclopentadienyl)) zirconium dichloride
isopropyl(9-fluorenyl) (1-(3-isopropylcyclopentadienyl)) zirconium dichloride
dimethylsilyl(9-fluorenyl) (1-(3-methylcyclopentadienyl)) zirconium dichloride
dimethylsilyl(9-fluorenyl) (1-(3-isopropylcyclopentadienyl) )zirconium dichloride
isopropyl(9-fluorenyl) (1-indenyl)zirconium dichloride or
dimethylsilyl(9-fluorenyl) (1-indenyl)zirconium dichloride.

4. A supported catalyst system as claimed in claim 1, wherein the cocatalyst is an aluminoxane of the formula VII

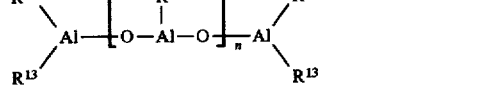

for the linear type and/or of the formula VIII

for the cyclic type, where, in formulae VII and VIII, $R^{13}$ is a $C_1$–$C_6$-alkyl group and n is an integer from 2 to 50.

5. A supported catalyst system as claimed in claim 4, wherein $R^{13}$ is methyl, ethyl, isobutyl, butyl, neopentyl, phenyl or benzyl and n is an integer from 2 to 50.

6. A supported catalyst system as claimed in claim 4, wherein $R^{13}$ is methyl and n is an integer from 4 to 40.

7. A process for the preparation of a supported catalyst system, comprising a support, at least one metallocene catalyst fixed to the support, and at least one cocatalyst, which comprises the step of fixing the catalyst to the support by bringing the catalyst into contact with a supported cocatalyst in a suspension and by irradiating with microwaves.

8. The process as claimed in claim 7, wherein the support material is partially crystalline or crosslinked polyolefin powder in finely divided form which is insoluble under the reaction conditions.

9. The process as claimed in claim 7, wherein the cocatalyst is fixed to the support material by irradiating with microwaves.

10. The process as claimed in claim 7, wherein the suspending medium employed is n-decane, hexane, heptane or hydrogenated diesel oil.

11. The process as claimed in claim 7, wherein the metallocene catalyst is in solution in a solvent and wherein the solvent for the metallocene catalyst is an inert solvent having only weak microwave-active bands, or none at all, in the wavelength range of the microwave unit employed.

12. The process as claimed in claim 11, wherein the solvent for the catalyst is selected from the group consisting of toluene, hexane, heptane, and dichloromethane.

13. The process as claimed in claim 7, wherein the catalyst is first brought into contact with the cocatalyst-coated support material with stirring at a temperature of between −80° C. and +30° C., whereby a homogeneous suspension is formed.

14. The process as claimed in claim 13, wherein the homogeneous suspension formed by stirring is subsequently irradiated with microwaves at a temperature of between −20° and +120° C.

15. The process as claimed in claim 14, wherein, when the reaction is complete, the supernatant solution is separated off, and the solid which remains is washed with an inert suspending medium.

16. The process as claimed in claim 15, wherein the solid which remains is subsequently resuspended, either dried as a powder or still containing solvent, and is metered into a polymerization system as a suspension in an inert suspending medium.

17. The process as claimed in claim 13, wherein the homogeneous suspension formed by stirring is subsequently irradiated with microwaves at a temperature of between 15° and 100° C.

18. The process as claimed in claim 7, wherein the frequency of the microwave radiation is in the range from 0.4 GHz to 24 GHz of.

19. The process as claimed in claim 12, wherein pulsed microwave radiation is used.

20. The process as claimed in claim 7, wherein the support material is silica gel, aluminum oxide, solid aluminoxane or another inorganic support material.

21. The process as claimed in claim 7, wherein the catalyst is first brought into contact with the cocatalyst-coated support material with stirring at a temperature of between from −10° C. to −40° C.

22. The process as claimed in claim 7, wherein the frequency of the microwave radiation is in the range from 0.4 GHz to 2.5 GHz.

23. The process as claimed in claim 7, wherein the frequency of the microwave radiation is at about 433 MHz, 915 MHz, or 2.45 GHz.

24. The process as claimed in claim 7, wherein the support material is magnesium chloride.

25. The process as claimed in claim 7, wherein the support material is an oxide prepared by flame pyrolysis by combustion of elemental halides in an oxyhydrogen gas flame.

* * * * *